United States Patent
Favier et al.

(10) Patent No.: US 7,205,362 B2
(45) Date of Patent: Apr. 17, 2007

(54) METHOD FOR CONTROLLED RADICAL POLYMERIZATION

(75) Inventors: Arnaud Favier, Marsonnas (FR); Marie-Therese Charreyre, Mornant (FR)

(73) Assignee: bioMérieux, Marcy L'Etoile (FR)

( * ) Notice: Subject to any disclaimer, the term of this patent is extended or adjusted under 35 U.S.C. 154(b) by 0 days.

(21) Appl. No.: 10/535,404

(22) PCT Filed: Dec. 12, 2003

(86) PCT No.: PCT/FR03/03680

§ 371 (c)(1),
(2), (4) Date: May 18, 2005

(87) PCT Pub. No.: WO2004/055060

PCT Pub. Date: Jul. 1, 2004

(65) Prior Publication Data

US 2006/0004160 A1   Jan. 5, 2006

(30) Foreign Application Priority Data

Dec. 13, 2002   (FR) .................................. 02 15888

(51) Int. Cl.
*C08F 2/06* (2006.01)
(52) U.S. Cl. ..................... 526/73; 526/78; 526/79; 526/219.6; 526/256; 526/257; 526/263; 526/286; 526/319
(58) Field of Classification Search ............. 526/73, 526/258, 263, 286, 319, 78, 79, 219.6, 256, 526/257

See application file for complete search history.

(56) References Cited

U.S. PATENT DOCUMENTS 4,279,795 A * 7/1981 Yamashita et al. .......... 523/112

(Continued)

FOREIGN PATENT DOCUMENTS

FR      2 794 464 A1   12/2000

(Continued)

OTHER PUBLICATIONS

D. Solomon, et al., "Free Radical Polymerization and the Produced Polymers," Chemical Abstracts, vol. 102, 1985, pp. 10-11.

(Continued)

*Primary Examiner*—David W. Wu
*Assistant Examiner*—M. Bernshteyn
(74) *Attorney, Agent, or Firm*—Oliff & Berridge, PLC (57) ABSTRACT

The present invention relates to a process for controlled radical polymerization using an organosulfur reversible chain transfer agent which consists in preparing polymers having a molar weight of greater than 100 000 g/mol, with a polydispersity index of less than 1.2 for molar weights of less than 200 000 g/mol and of less than 1.4 for molar weights of greater than 200 000 g/mol, with a degree of conversion of monomer of greater than 75% and a polymerization time of less than 8 h, characterized by the control of the flux of initiator radicals in the polymerization medium.

The control of the flux of initiator radicals can be achieved by the use of two appropriate polymerization temperatures $T_1$ and $T_2$ or by use of an initiator having a decomposition rate constant which is greater than that of azobisisobutyronitrile at the same temperature.

13 Claims, 3 Drawing Sheets

U.S. PATENT DOCUMENTS

| | | | |
|---|---|---|---|
| 4,521,317 A | | 6/1985 | Candau et al. |
| 5,723,344 A | * | 3/1998 | Mabilat et al. ............. 436/518 |
| 6,359,093 B1 | * | 3/2002 | Takaki et al. ............ 526/307.6 |
| 6,380,335 B1 | | 4/2002 | Charmot et al. |
| 6,395,850 B1 | | 5/2002 | Charmot et al. |
| 6,716,948 B1 | * | 4/2004 | Klaerner et al. ......... 526/303.1 |
| 6,765,078 B2 | * | 7/2004 | Husemann et al. ......... 526/319 |
| 6,858,309 B2 | * | 2/2005 | Kambouris et al. ......... 428/447 |
| 2003/0139553 A1 | * | 7/2003 | Matyjasewski et al. ..... 526/319 |
| 2004/0091451 A1 | * | 5/2004 | Charreyre et al. ....... 424/78.19 |
| 2004/0110893 A1 | * | 6/2004 | Matyjaszewski et al. ... 524/556 |
| 2004/0171777 A1 | * | 9/2004 | Le et al. ..................... 526/286 |

FOREIGN PATENT DOCUMENTS

| | | | |
|---|---|---|---|
| FR | 2 809 829 A1 | | 12/2001 |
| FR | 2 812 293 A1 | | 2/2002 |
| FR | 2 816 311 A1 | | 5/2002 |
| FR | 2 821 620 A | | 9/2002 |
| JP | 62149746 A | * | 7/1987 |
| JP | 62187756 A | * | 8/1987 |
| JP | 2002338817 A | * | 11/2002 |
| WO | WO 98/01478 A1 | | 1/1998 |
| WO | WO 98/58974 A1 | | 12/1998 |
| WO | WO 98/58975 A1 | | 12/1998 |
| WO | WO 99/31144 A1 | | 6/1999 |
| WO | WO 99/35177 A1 | | 7/1999 |
| WO | WO 00/75207 A1 | | 12/2000 |
| WO | WO 01/42312 A1 | | 6/2001 |
| WO | WO 01/60792 A1 | | 8/2001 |
| WO | WO 01/92361 A1 | | 12/2001 |
| WO | WO 02/070571 A1 | | 9/2002 |

OTHER PUBLICATIONS

Jin-Shan Wang and Krzysztof Matyjaszewski, "Controlled/"Living" Radical Polymerization. Halogen Atom Transfer Radical Polymerization Promoted by a Cu(I)/Cu(II) Redox Process," Macromolecules 1995, vol. 28, 7901-7910.

G. Moad & D. H. Solomon, "The Chemistry of Free Radical Polymerization," Pergamon, London, pp. 53-95 (1995).

Favier et al., "Study of the RAFT Polymerization of a Water-Soluble Disubstituted Acrylamide Derivative. 1. Influence of the Dithioester Structure", Macromolecules, 2002, pp. 8271-8280.

D' Agosto et al., "molecular weight and functional end group control by RAFT polymerization of a bisubstituted acrylamide derive", Macromolecules, vol. 36, 2003, pp. 621-629.

* cited by examiner

METHOD FOR CONTROLLED RADICAL POLYMERIZATION

The present invention relates to the field of polymers and of controlled polymerization. More particularly, a subject matter of the present invention is a novel controlled radical polymerization process which makes it possible to prepare polymers of high molar weight having a very low molar weight distribution index (polydispersity) over a relatively short polymerization time and with a very high conversion of monomer.

The development of polymers meeting the needs of new applications is one of the challenges of research. As the physical properties of a polymer are closely related to its macromolecular structure (architecture of the chains, polydispersity, and the like), controlling the synthesis of the polymer chains makes it possible to obtain polymers with well-defined properties. Currently, this approach is based on the use of conventional monomers and the control of the macromolecular structure is the main route for the development of novel polymers.

Living ionic polymerization makes it possible to synthesize polymers with well-defined macromolecular characteristics (molar weight, polydispersity index and architecture of the chains). However, very rigorous experimental conditions are required. Furthermore, this technique is generally applied to hydrophobic and nonpolar monomers, which greatly restricts its use.

Much greater use is made of radical polymerization as it is more flexible to employ: the presence of impurities is not totally unacceptable, the reaction can be carried out in an aqueous medium and a great many monomers can be used. However, it is difficult to control the macromolecular structure of the polymers formed, in particular that of block copolymers.

Controlled (or living) radical polymerization, combining the advantages of radical polymerization and the control of the macromolecular characteristics, is thus a cutting edge research subject.

Radical polymerization comprises three stages: initiation (creation of free radicals and reaction with the first monomer unit), propagation (successive additions of monomer units to the growing chain (macroradical)) and termination (halting of a chain) by coupling or disproportionation between two growing chains or by transfer of a proton to a growing chain.

The termination and transfer reactions affecting the (macro)radicals are responsible for the loss of control of the polymerization (formation of nonlinear polymers, high polydispersity). To obtain controlled radical polymerization, it is thus advisable to greatly reduce, indeed even to eliminate, these irreversible termination and transfer reactions. The general principle consists in reversibly deactivating the active centers with the formation of dormant (unreactive) entities, in order to have a very low concentration of (macro)radicals in the medium throughout the polymerization (de Barbeyrac J., March 2001, TechnoPol'der, No. 37, 6).

Two types of deactivation of (macro)radicals which make it possible to obtain controlled radical polymerization have recently been developed:
  by reversible termination, either by coupling with a nitroxide (stable radical), generally referred to as the SFRP (Stable Free Radical Polymerization) process (Solomon D. et al., 1985, Chem. Abstr., 1985, 102, 221335q), or by coupling with a halogen atom, generally referred to as the ATRP (Atom Transfer Radical Polymerization) process (Wang J. S. et al., 1995, Macromol., 28, 7901), and
  by reversible chain transfer, which process uses a transfer agent including the following unit:

In the continuation of the description, the latter process will be referred to as "controlled radical polymerization process using an organosulfur reversible chain transfer agent".

An example of such a controlled radical polymerization process using an organosulfur reversible chain transfer agent is the RAFT (Reversible Addition Fragmentation Chain Transfer) process as disclosed in patent application WO 98/01478, where the chain transfer agent is a dithioester. This RAFT process as disclosed in patent application WO 98/01478 is carried out at a uniform temperature and makes it possible to obtain polymers having different molar weights with variable polymerization times, polydispersity indexes and conversions of monomer. With this process, when polymers are synthesized, in particular polymers with a high molar weight (greater than 100 000 g/mol), when the polymerization time is short, that is to say less than 8 hours, the conversion of monomer is low, that is to say much less than 50%. In the reverse case, that is to say to obtain polymers with a high conversion of monomer, of greater than 80%, the polymerization time has to be high. The process disclosed in patent application WO 98/01478 thus has the disadvantage that it does not make it possible to obtain polymers having a high molar weight in a short polymerization time and with a high conversion of monomer.

Patent application WO 99/31144 discloses a RAFT polymerization process in which the transfer agent is chosen from xanthates and dithiocarbamates. The use of xanthates has the disadvantage that polymers with a high molar weight can only be obtained with a very long polymermization time, of greater than 8 hours, a low conversion of monomer and a moderate polydispersity index much greater than 1.2. The use of dithiocarbamates for the preparation of polymers having a high molar weight (of greater than 100 000 g/mol) makes it possible to improve the conversion of monomer and, to a lesser extent, the polydispersity index, without, however, reaching values of less than 1.2. To achieve a polydispersity index of approximately 1.20, the polymerization time has to be greater than 8 hours.

The Applicant has now discovered, contrary to all expectation, that the control of the flux of initiator radicals in the polymerization medium in a controlled radical polymerization process using an organosulfur reversible chain transfer agent makes it possible to prepare polymers having a high molar weight, at least equal to 100 000 g/mol, with a low polydispersity index, in a short polymerization time, of less than 8 hours, and with a high conversion of monomer, of greater than 75%, these four criteria being obtained simultaneously. Furthermore, a linear growth of the molar weights with the conversion is obtained, which is the essential criterion for a controlled polymerization.

Thus, a subject matter of the present invention is a process for controlled radical polymerization using an organosulfur reversible chain transfer agent which consists in preparing polymers having a molar weight of greater than 100 000 g/mol, with a polydispersity index of less than 1.2 for molar weights of less than 200 000 g/mol and of less than 1.4 for molar weights of greater than 200 000 g/mol, with a degree of conversion of monomer of greater than 75% and a polymerization time of less than 8 h, characterized by the control of the flux of initiator radicals in the polymerization medium.

Before describing the invention in more detail, certain terms employed in the description and the claims, in addition to those indicated above, are defined below.

The term "molar weight" is understood to mean, within the meaning of the invention, the number-average molar weight, Mn, of the polymer chains formed. In the present case, it is obtained after analysis of the samples by steric exclusion chromatography using two detectors, a detector of refractometer type coupled to a light scattering device, which makes it possible to have access to absolute molar weight values (in contrast to the relative molar weights obtained when calibration with polymer standards is used). The light scattering device is a miniDawn device (Wyatt Technology) and the molar weights are determined with Astra software (Wyatt Technology).

As indicated above, the polydispersity index is the distribution index of the molar weights which is well known to a person skilled in the art. Thus, the polydispersity index is PI, with PI=Mw/Mn, Mn being as defined above and Mw being the weight-average molar weight of the polymer chains. In the present case, it was also determined with Astra software.

When the molar weight of the polymer synthesized according to the process of the invention is between 100 000 and 200 000 g/mol, this index is absolutely less than 1.2. When the molar weight is greater than 200 000 g/mol, the polydispersity index is absolutely less than 1.4.

The source of initiator radicals which is appropriate for the purposes of the invention includes the compounds which provide free radicals which add to the monomers to produce propagating radicals. The propagating radicals are radical entities which have added one or more monomer units and which are capable of adding additional monomer units.

The term "control of the flux of initiator radicals in the polymerization medium" is understood to mean a choice of polymerization conditions which makes it possible to obtain a high flux of initiator radicals during the initiation period, so that the polymerization is carried out over a duration of a few minutes, preferably a duration of less than 30 minutes, preferably less than 15 minutes, and then, after the initiation period, a lower flux of radicals, and this until the end of the polymerization.

If the source of radicals is an initiating agent, the control of the flux of radicals is carried out via the rate of decomposition of said initiator, which is chosen to be high during the initiation period and as low as possible after the initiation period while being sufficient for the polymerization to continue until a conversion of at least 75% over a period of time of at most 8 hours. For example, if the [organosulfur agent]$_0$/[initiator]$_0$ molar ratio is 3.3, with [X]$_0$ meaning the molar concentration of reactant X at the beginning of polymerization, conditions (temperature, nature of the initiator) are chosen so that the rate constant for decomposition of the initiator, kd, is greater than $1 \times 10^{-5}$ s$^{-1}$, preferably greater than $5 \times 10^{-5}$ s$^{-1}$, during the initiation period and such that the rate of decomposition of the initiator is as low as possible after the initiation period, the value of kd, however, remaining greater than $2 \times 10^{-7}$ s$^{-1}$, a nonzero residual concentration of initiator being retained until the end of the polymerization, in order for the polymerization to continue up to a conversion of at least 75% over a period of time of at most 8 hours. For the [organosulfur agent]$_0$/[initiator]$_0$ molar ratios other than 3.3, a person skilled in the art will adjust (by the choice of the initiator and/or the choice of the temperature) the kd value in order to obtain the same flux of radicals (which can be calculated from kd and from [initiator]$_0$).

When the source of the radicals is a mixture of initiating agents or any source of radicals other than initiating agent (for example, spontaneous production from the monomer or else high energy radiation, such as an electron beam, X rays or gamma rays), the polymerization conditions are chosen so as to obtain a flux of radicals equivalent to that obtained with an initiating agent during and after the initiation period.

The term "initiation period" is understood to mean, in a controlled radical polymerization using an organosulfur reversible chain transfer agent, the period between the beginning of the polymerization and the end of the initiation, the end of the initiation corresponding to the complete consumption of the chain transfer agent and being observed visually by a change in coloration of the medium.

The process for radical polymerization controlled by use of an organosulfur reversible chain transfer agent at the basis of the invention is as defined above and is widely known to a person skilled in the art. It may be defined as bringing identical or different monomers into contact in the presence of an organosulfur reversible chain transfer agent and of a source of initiator radicals.

Insofar as the monomers used are identical, the process of the invention makes it possible to prepare polymers of homopolymer type. In the contrary case, it makes it possible to prepare polymers of copolymer type, such as random copolymers, for example alternating copolymers, and block copolymers, each block being either a homopolymer or a random copolymer.

The monomers appropriate for the purposes of the invention are any ethylenically unsaturated monomer and can be chosen from the group consisting of styrene, substituted styrenes, substituted or unsubstituted alkyl (meth)acrylates, acrylonitrile, methacrylonitrile, acrylamide, methacrylamide, derivatives mono-and disubstituted on the nitrogen of the acrylamide and of the methacrylamide, isoprene, butadiene, ethylene, vinylacetate and their combinations.

The functionalized versions of these monomers are also suitable for the purposes of the invention.

The specific monomers and comonomers which can be used in the invention include methyl methacrylate, ethyl methacrylate, propyl methacrylate (all the isomers), butyl methacrylate (all the isomers), 2-ethylhexyl methacrylate, isobornyl methacrylate, methacrylic acid, benzyl methacrylate, phenyl methacrylate, methacrylonitrile, a-methylstyrene, methyl acrylate, ethyl acrylate, propyl acrylate (all the isomers), butyl acrylate (all the isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all the isomers), hydroxybutyl methacrylate (all the isomers), N,N-dimethylaminoethyl methacrylate, N,N-diethylaminoethyl methacrylate, triethylene glycol methacrylate, N-methacryloyloxysuccinimide, itaconic anhydride, itaconic acid, glycidyl acrylate, 2-hydroxyethyl acrylate, hydroxypropyl acrylate (all the isomers), hydroxybutyl acrylate (all the isomers), N,N-dimethylaminoethyl acrylate, N,N-diethylaminoethyl acrylate, triethylene glycol acrylate, N-acryloyloxysuccinimide, methacrylamide, N-methylacrylamide, N,N-dimethylacrylamide, N-(tert-butyl)methacrylamide, N-(n-butyl)methacrylamide, N-methylolmethacrylamide, N-ethylolmethacrylamide, N-(tert-butyl)acrylamide, N-octadecylacrylamide, N-methylolacrylamide, N-ethylolacrylamide, N-acryloylmorpholine, vinylbenzoic acid (all the isomers), diethylaminostyrene (all the isomers), α-methylvinyl-benzoic acid (all the isomers), diethylamino-α-methylstyrene (all the isomers), the acid or the sodium salt of p-vinylbenzenesulfonic acid, trimethoxysilylpropyl methacrylate, tributoxysilylpropyl methacrylate, the dimethoxymethylsilylpropyl methacrylate, diethoxy-methylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, tributoxysilylpropyl acrylate, dimethoxymethylsilylpropyl acrylate, diethoxymethylsilylpropyl acrylate, dibutoxymethyl-silylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, N-vinylpyrrolidone, butadiene, isoprene, chloroprene, ethylene, vinyl acetate and their combinations.

According to a specific embodiment of the invention, the monomer used in the process of the invention is a monomer derived from acrylamide or from acrylate, preferably N-acryloylmorpholine, N,N-dimethylacrylamide, N-(tert-butyl)acrylamide, N-octadecylacrylamide, n-butyl acrylate, t-butyl acrylate or N-acryloyloxysuccinimide and in particular N-acryloylmorpholine (NAM).

The amount of monomer to be added in the process of the invention is not limited by any one of the aspects of the process and will be easily determined by a person skilled in the art.

The organosulfur chain transfer agent is as defined above, namely that it has the following unit:

These organosulfur chain transfer agents can be either dithioesters, as disclosed in patent application WO 98/01478, or xanthates, as disclosed in particular in patent applications WO 98/58974, WO 99/31144, WO 00/75207, WO 01/42312 and FR 00/07145, or dithiocarbamates, as disclosed in particular in patent applications WO 99/31144, WO 99/35177 and FR 00/07145, or trithiocarbonates, as disclosed in particular in patent applications WO 98/58974, WO 01/60792 and WO 02/070571, or thioether thiones, as disclosed in particular in patent application FR 99/07097, or dithiocarbazates, as disclosed in particular in patent applications U.S. Pat. Nos. 6,380,335 and 6,395,850, or dithiophosphoric esters, as disclosed in particular in patent application FR 2 812 293, or tetrathiophosphates, as disclosed in particular in patent application FR 2 816 311.

The organosulfur chain transfer agent used for the purposes of the invention can also be one of the following novel dithioesters:

2,3-dimethylpropyl dithiobenzoate of formula:

bis(3-methylbutyl) 2-(thiobenzoylthio)succinate of formula:

tert-nonyl dithiobenzoate of formula:

These novel compounds are obtained according to the procedure disclosed in patent application WO 01/92361 filed by the Applicant, apart from the fact that the sodium thiolate is suited to the final product desired.

According to one specific embodiment, the transfer agent is the dithioester tert-butyl dithiobenzoate.

The amount of transfer agent to be used is directly dependent on the molar weight desired for the polymer chains, according to the following equation, defined for controlled radical polymerizations using a reversible chain transfer agent (as disclosed, for example, in patent WO 98/01478):

$Mn=[\text{monomer}]_0/[\text{transfer agent}]_0 \times \text{conversion of monomer} \times M_{mon} + M_{ta}$ where Mn is the number-average molar weight of the polymer chains, $[X]_0$ means the molar concentration of reactant X at the beginning of polymerization, and $M_{mon}$ and $M_{ta}$ are the weights of the monomer and transfer agent respectively.

The source of initiator radicals can be any method which generates free radicals and which produces free radicals capable of adding to monomer units to give propagating radicals.

The source of initiator radicals includes sources such as the thermally induced homolytic cleavage of one or more suitable compounds, such as peroxides, peroxyesters or azo compounds, spontaneous generation from monomers, redox initiation systems, photochemical initiation systems and high energy radiation, such as electron beams, X rays or gamma rays. The initiation system is chosen so that, under the reaction conditions, there is not significant unfavorable interaction between the initiator or radicals originating from the initiator and the transfer agent. The initiator must also have the solubility required in the reaction medium or the mixture of monomers.

Examples of initiator which can be used for the purposes of the invention comprise azo compounds and peroxides, such as 2,2'-azobis(2,4-dimethylvaleronitrile), 2,2'-azobis (isobutyronitrile), 2,2'-azobis-(2-cyano-2-butane), 2,2'-azobis(methyl isobutyrate), 4,4'-azobis(4-cyanopentanoic acid), 4,4'-azobis-(4-cyanopentan-1-ol), 1,1'-azobis(cyclohexanecarbonitrile), 2-(t-butylazo)-2-cyanopropane, 2,2'-azobis-[2-methyl-N-(1,1)-bis(hydroxymethyl)-2-hydroxyethyl]-propionamide, 2,2'-azobis[2-methyl-N-(2-hydroxyethyl)]-propionamide], 2,2'-azobis(N,N'-dimethyleneisobutyramidine) dihydrochloride, 2,2'-azobis (2-amidinopropane) dihydrochloride, 2,2'-azobis(N,N'-dimethyleneisobutyramidine), 2,2'-azobis(2-methyl-N-[1,1-bis(hydroxymethyl)-2-hydroxyethyl]propionamide), 2,2'-azobis-(2-methyl-N-[1,1-bis(hydroxymethyl)ethyl] propionamide, 2,2'-azobis[2-methyl-N-(2-hydroxyethyl) propionamide, 2,2'-azobis(isobutyramide) dihydrate, 2,2'-azobis-(2,2,4-trimethylpentane), 2,2'-azobis(2-methylpropane), 2,2'-azobis(2-(N-phenylamidino)propane) dihydrochloride, 2,2'-azobis(2-(N-(4-chlorophenyl)amidino)-propane) dihydrochloride, 2,2'-azobis(2-(N-(4-hydroxyphenyl)amidino)propane) dihydrochloride, 2,2'-azobis-(2-(N-benzylamidino)propane) dihydrochloride, 2,2'-azo-bis(2-(N-allylamidino)propane) dihydrochloride, 2,2'-azobis(5-methyl-(N,N'-dimethyleneisobutyramidine)) dihydrochloride, 2,2'-azobis(2-(4,5,6,7-tetrahydro-1H-1,3-diazepin-2-yl)propane) dihydrochloride, 2,2'-azobis(2-(3,4,5,6-tetrahydropyrimidin-2-yl)propane) dihydrochloride, 2,2'-azobis(2-(5-hydroxy-3,4,5,6-tetrahydropyrimidin-2-yl) propane) dihydrochloride, 2,2'-azobis(2-(1-(2-hydroxyethyl)-2-imidazolin-2-yl)propane dihydrochloride, t-butyl peroxyacetate, t-butyl peroxybenzoate, t-butyl peroxyoctoate, t-butyl peroxyneodecanoate, t-butyl peroxyisobutyrate, t-amyl peroxypivalate, t-butyl peroxypivalate, diisopropyl peroxydicarbonate, dicyclohexyl peroxydicarbonate, dicumyl peroxide, dibenzyl peroxide, dilauryl peroxide, potassium peroxydisulfate, ammonium peroxydisulfate, di(t-butyl) hyponitrite and dicumyl hyponitrite.

The initiator radicals can also be produced thermally from the monomer (e.g., styrene), by the photochemical route, from redox systems or by a combination of these methods.

The photochemical initiation systems are chosen in order to exhibit the required solubility in the reaction medium or the mixture of monomers and have a quantum yield appropriate for the production of radicals under the polymerization conditions. Examples of such systems include benzoin derivatives, benzophenone, acylphosphine oxides and photoredox systems.

The redox initiation systems are chosen in order to exhibit the required solubility in the reaction medium or the mixture of monomers and have a rate appropriate for the production of radicals under the polymerization conditions. Examples of such systems comprise the following combinations of oxidizing agents and reducing agents:

oxidizing agents: potassium peroxydisulfate, hydrogen peroxide or t-butyl hydroperoxide,
reducing agents: iron(II), titanium(III), potassium thiosulfite or potassium bisulfite.

Other appropriate initiation systems are described in the literature (see Moad and Solomon "The Chemistry of Free Radical Polymerization", Pergamon, London, 1995, pp. 53–95).

The amount of initiating agent to be added in the process of the invention is chosen so that the [transfer agent]$_0$/[initiator]$_0$ molar ratio is between 1 and 100, preferably between 2 and 50, preferably between 3 and 20.

As indicated above, the control of the flux of initiator radicals in the polymerization medium in a process for controlled radical polymerization using an organosulfur reversible chain transfer agent makes possible the production of polymers having molar weights of greater than 100 000 g/mol, with a low poly-dispersity index, in a polymerization time of less than 8 hours and with a degree of conversion of monomers of greater than 75%, which was not possible simultaneously with the processes of the prior art.

When the control of the flux of initiator radicals is achieved by the control of the decomposition of the initiating agent, this control can be implemented in two ways, namely using:

a polymerization temperature gradient appropriately chosen as a function of the polymerization stage under consideration, or a uniform polymerization temperature and an initiator having a high decomposition constant at the temperature under consideration, that is to say greater than that of azobisisobutyronitrile (AIBN) at this temperature.

Thus, according to a specific embodiment, the control of the flux of initiator radicals is achieved by the stages consisting in:

i) maintaining a uniform polymerization temperature $T_1$ during the initiation period, and ii) continuing the polymerization, the polymerization temperature being allowed to fall to the temperature $T_2$, it being understood that $T_1$ and $T_2$ correspond to the following equations (1) and (2):

$$T_1 > T_2 \quad (1) \text{ and}$$

$$T_1 - T_2 \leq 50° \text{ C.} \quad (2).$$

The temperature $T_1$ is preferably a relatively high temperature for a polymerization temperature. Preferably, this temperature is between 60 and 95° C., more preferably between 80 and 90° C.

The temperature $T_2$ is thus absolutely less than the temperature $T_1$ and is such that its difference from $T_1$ is not greater than 50° C. Preferably, this difference is not less than 10° C.

When the difference between $T_1$ and $T_2$ is greater than 50° C., the 4 criteria are not met simultaneously. By way of example, if $T_1 = 95°$ C. and if $T_2 = 44°$ C., the polymerization slows down considerably and it is not possible to achieve a high conversion in less than 8 hours.

According to one embodiment of the invention, $T_2$ is between 40 and 75° C., more preferably between 50 and 70° C.

According to a preferred embodiment of the invention, $T_1$ is between 80 and 90° C., whereas $T_2$ is between 50 and 70° C. In a particularly preferred way, $T_1$ is equal to 80° C. and $T_2$ is equal to 60° C.

The reduction in the temperature is carried out passively, for example by using a thermostatically-controlled bath, such as an oil bath, the temperature of which is regulated at $T_1$ during the initiation period and then at $T_2$ at the end of this period. In this case, the thermostatically-controlled device will not operate as long as the temperature is greater than $T_2$ and will restart only where the temperature will be just below $T_2$, in order to maintain a temperature $T_2$.

This temperature gradient can also be implemented using a jacketed reactor connected to a thermostatically-controlled bath or using any other device for regulating the temperature.

When this temperature gradient is used, the nature of the initiator is not important and the initiators as defined above can be used. However, according to a specific embodiment, the initiator used is azobisisobutyronitrile (AIBN).

As indicated above, the control of the flux of initiator radicals can also be achieved by the use of an initiator which has the ability to decompose very rapidly.

Thus, according to another embodiment of the invention, the control of the flux of initiator radicals is achieved by adopting a uniform polymerization temperature and by using an initiating agent having a decomposition rate constant, kd, which is greater than that of AIBN at this same temperature.

Such initiating agents are widely known to a person skilled in the art and are, for example, 2,2'-azobis-(4-methoxy-2,4-dimethylvaleronitrile), 2,2'-azobis-(2-cyclopropylpropionitrile), 2,2'-azobis(2,4-di-methylvaleronitrile), 2,2'-azobis[2-methyl-N-(2-hydroxyethyl)propionamide], 2,2'-azobis(N,N'-di-methyleneisobutyramidine) dihydrochloride, 2,2'-azobis-(2-amidinopropane) dihydrochloride, 2,2'-azobis(N,N'-dimethyleneisobutyramidine), 2,2'-azobis(2-(N-phenyl-amidino)propane) dihydrochloride, 2,2'-azobis(2-(N-(4-chlorophenyl)amidino)propane)dihydrochloride, 2,2'-azobis(2-(N-(4-hydroxyphenyl)amidino)propane) dihydrochloride, 2,2'-azobis(2-(N-benzylamidino)propane) dihydrochloride, 2,2'-azobis(2-(N-allylamidino)propane) dihydrochloride, 2,2'-azobis(5-methyl-N,N'-dimethyleneisobutyramidine) dihydrochloride, 2,2'-azobis(2-(4,5,6,7-tetrahydro-1H-1,3-diazepin-2-yl)propane) dihydrochloride, 2,2'-azobis(2-(3,4,5,6 -tetrahydropyrimidin-2-yl) propane)dihydrochloride, 2,2'-azobis(2-(5-hydroxy-3,4,5,6-tetrahydropyrimidin-2 -yl)propane)dihydrochloride or 2,2'-azobis(2-(1-(2-hydroxyethyl)-2-imidazolin-2-yl)propane) dihydrochloride.

According to a specific embodiment, the initiating agent is the initiating agent 2,2'-azobis(2,4 -dimethylvaleronitrile), known under the trade name (Wako) of V65.

In this embodiment, where a uniform polymerization temperature and a specific initiating agent are used, the polymerization temperature is, for example, 60° C. with V65.

The process of the invention thus makes it possible to provide polymer chains having a high molar weight, of greater than 100 000 g/mol, with a very low polydispersity index, less than 1.2 when the molar weight is less than or equal to 200 000 g/mol and less than 1.4 when the molar weight is greater than 200 000 g/mol, with a high conversion of monomer, of greater than 75%, and in a short polymerization time, of less than 8 hours, these four parameters being considered simultaneously.

The process of the invention makes it possible for the first time to prepare polymers of acrylamide or of its derivatives having a number-average molar weight of greater than or equal to 100 000 g/mol, it being understood that, when the molar weight is absolutely less than 200 000 g/mol, the PI is less than 1.2 and, when the molar weight is greater than 200 000 g/mol, the PI is less than 1.4. These novel polymers, capable of being obtained by the process according to the invention, constitute another subject matter of the invention.

According to a specific embodiment, such a novel polymer is an N-acryloylmorpholine polymer.

The polymers obtained according to the process of the invention have applications in many fields and can make it possible in particular to improve the mechanical properties (strength, elasticity, adhesion) and the rheological properties (increase in the viscosity) of various formulations in the fields of adhesives, paints, inks, and the like.

Finally, the polymers of the invention can be used as calibration standards for molar weights, particularly as regards polyacrylamide derivatives, for which there do not currently exist standards for a molar weight of greater than 100 000 g/mol having a polydispersity index of less than 1.5.

The invention will be better understood with the help of the following examples, given by way of illustration and without limitation, and with the help of FIGS. 1 to 3, in which.

EXAMPLE 1

Preparation of NAM Homopolymers 1.1 General Procedure

The N-acryloylmorpholine (NAM, sold by Polysciences Inc., reference 21192) is distilled before use in polymerization.

The dioxane (solvent) sold by SDS, reference 27,053-9) is distilled over $LiAlH_4$ before use.

The azobisisobutyronitrile AIBN (polymerization initiator) (Fluka, reference 11630) is recrystallized from ethanol.

The azobis(dimethylvaleronitrile) (polymerization initiator) (Wako, reference V65) is recrystallized from ethanol.

The trioxane (internal reference for monitoring by $^1H$ NMR) (sold by Janssen-Chimica, reference 14.029.61) is used as is.

The transfer agent used is tert-butyl dithiobenzoate, prepared according to the procedure disclosed in patent application WO 01/92361, that is to say as indicated in part 2.1 below, apart from the fact that 3-mercapto-2-butanol is replaced by sodium t-butylthiolate. The polymer chains formed using this transfer agent carry, at one of their ends, a dithioester functional group (which can be easily hydrolyzed to a thio functional group, for example by the action of a primary amine) and, at the other end, a t-butyl functional group.

1.2 Synthesis of the Homopolymer A Using a Temperature Gradient

The various reactants (monomer, tert-butyl dithiobenzoate, radical initiator AIBN, trioxane, dioxane) (see concentrations in table 1) are introduced into a reactor of Schlenk type at ambient temperature and the mixture is degassed by a sequence of freezing/vacuum/defrosting cycles, in order to remove any trace of oxygen, and then placed under nitrogen. The reaction mixture is brought to the desired temperature, 80° C., with stirring. After the change in color of the reaction medium from purple to orange-colored, characteristic of the complete consumption of the t-butyl dithiobenzoate (6 min), the set point of the thermostatically-controlled bath is fixed at 60° C. The temperature of the bath gradually decreases to this value in 35 min.

Samples are withdrawn regularly (with a hollow needle under nitrogen) and analyzed to determine the kinetics and the change in the molar weights with the conversion.

1.3 Synthesis of the Homopolymers B and C Using the Initiator V65

The various reactants (monomer, tert-butyl dithiobenzoate, radical initiator V65, trioxane, dioxane) (see concentrations in table 1) are introduced into a reactor of Schlenk type at ambient temperature and the mixture is degassed by a sequence of freezing/vacuum/defrosting cycles, in order to remove any trace of oxygen, and then placed under nitrogen. The reaction mixture is brought to a temperature of 60° C. with stirring and is maintained at this temperature throughout the duration of the polymerization.

Samples are withdrawn regularly (with a hollow needle under nitrogen) and analyzed to determine the kinetics and the change in the molar weights with the conversion.

1.4 Kinetic Monitoring of the Polymerization:

The kinetic monitoring of the consumption of the monomers is carried out by $^1$H NMR (Nuclear Magnetic Resonance) on a Varian Unity Plus 500 MHz spectrometer.

The samples to be analyzed are prepared by mixing 300 μl of each withdrawn sample with 300 μl of deuterated solvent: $CDCl_3$. The $^1$H NMR analysis is carried out by irradiating the dioxane peak. This method exhibits the advantage of analyzing the reaction medium without evaporating the synthesis solvent and thus makes it possible to avoid possible conversions of the products.

The decrease in the peaks relating to the vinyl protons of the monomers is monitored as a function of the time with respect to an internal reference, trioxane. Trioxane has the distinguishing feature of exhibiting a $^1$H NMR peak in the form of a strong thin singlet isolated from the vinyl protons of the monomer NAM (see FIG. 1 of patent application WO 01/92361 as example of NMR spectrum).

The conversions of the monomer are obtained by:

$$C_{NAM} = 1 - \frac{\left(\frac{H_{NAM}}{H_{trioxane}}\right)_t}{\left(\frac{H_{NAM}}{H_{trioxane}}\right)_0}$$

with $C_{NAM}$: conversion of NAM, $H_{NAM}$: integral relating to a proton of the NAM, $H_{trioxane}$: integral relating to the six protons of the trioxane.

1.5 Conditions for Analysis of the Molar Weights

Mn is the number-average molar weight of the polymer chains formed, Mpeak corresponds to the molar weight of the dominant population and PI is the polydispersity index, reflecting the homogeneity in the weights of the polymer chains (the closer PI is to 1, the more homogeneous in weight are the polymer chains).

Conditions for the analyses by SEC in the aqueous phase with a light scattering detector (LSD):

Columns: Ultra Hydrogel 500 and 2000 (Waters),
Pump: Waters 510,
UV detector: Waters 484,
Differential refractometric detector: Waters 410,
Dynamic light scattering detector: MiniDawn three angles, Wyatt Technologies,
Eluent: Borate buffer, 0.05 M, pH =9.3,
Flow rate: 0.5 ml.min$^{-1}$.

The refractive index increment, (dn/dc), of the NAM homopolymer under these buffer conditions was determined using an NFT ScanRef interferometer. A value of 0.163 ml/g was obtained.

Operating conditions for the tests on homopolymerization of NAM in the presence of t-butyl dithiobenzoate according to the process of the invention.

TABLE 1

| Homo-polymer | [NAM] (mol · l$^{-1}$) | [NAM]/ [dithioester] | [Dithioester]/ [initiator] | Method of implementation Temperature and Initiating agent |
|---|---|---|---|---|
| A | 3.75 | 709 | 3.3 | Temperature gradient AIBN |
| B | 3.75 | 709 | 3.3 | 60° C. V65 |
| C | 3.75 | 3545 | 3.3 | 60° C. V65 |

[X] means molar concentration of reactant X.

The monitoring of the polymerization characteristics is shown in the table below, the molar weights being obtained by SEC coupled to a light scattering detector (LSD).

TABLE 2

| Homo-polymer concerned | Polymerization time (h) | Conversion of monomer (%) | Mn (g/mol) | Mpeak (g/mol) | PI |
|---|---|---|---|---|---|
| A | 0.25 | 21.7 | 23 200 | 23 100 | 1.03 |
|   | 0.42 | 32.1 | 36 200 | 33 500 | 1.02 |
|   | 0.67 | 36.8 | 41 500 | 41 900 | 1.01 |
|   | 1 | 41.1 | 45 300 | 46 700 | 1.02 |
|   | 2 | 51.1 | 58 500 | 60 200 | 1.02 |
|   | 5 | 67.7 | 84 600 | 87 700 | 1.05 |
|   | 8 | 82.8 | 102 800 | 105 500 | 1.08 |
| B | 0.33 | 0.4 |  |  |  |
|   | 0.67 | 22.5 | 25 200 | 25 500 | 1.01 |
|   | 0.92 | 36 | 39 100 | 39 300 | 1.01 |
|   | 1.17 | 45.1 | 49 500 | 49 600 | 1.01 |
|   | 1.5 | 55.1 | 60 400 | 61 000 | 1.04 |
|   | 3 | 72.2 | 90 000 | 90 100 | 1.07 |
|   | 6 | 90.5 | 106 500 | 107 000 | 1.10 |
| C | 0.67 | 15.2 | 74 400 | 86 600 | 1.08 |
|   | 1 | 39.1 | 178 000 | 217 900 | 1.15 |
|   | 1.5 | 59.9 | 242 300 | 324 500 | 1.30 |
|   | 2 | 75.6 | 297 400 | 394 400 | 1.36 |

The results in the above table clearly demonstrate that the process of the invention makes it possible to prepare polymer chains having a high molar weight, of greater than 100 000 g/mol, with a very low polydispersity index, of less than 1.2 for weights of up to 200 000 g/mol and of less than 1.4 for weights of greater than 200 000 g/mol, with a high conversion of monomer, of greater than 75%, and in a short polymerization time not exceeding 8 hours, these four parameters being considered simultaneously.

Figure 1:
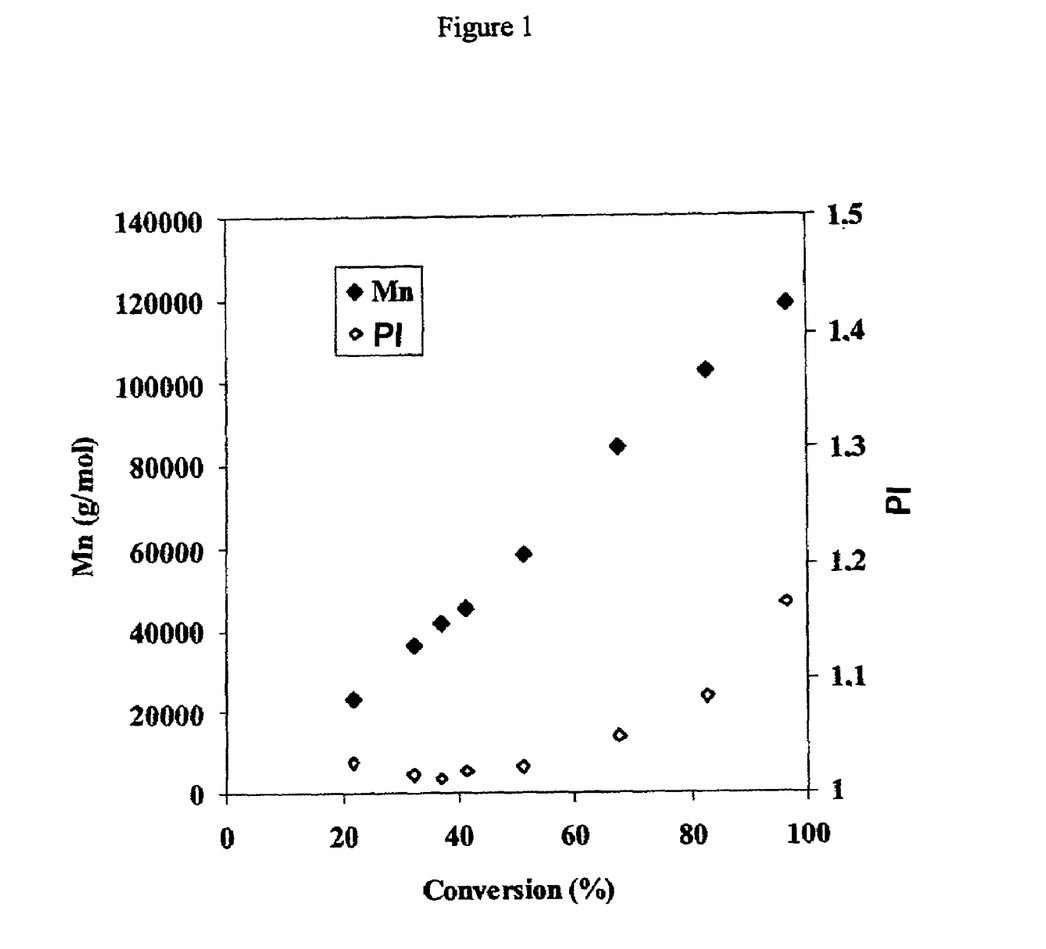
FIG. 1 represents a graph showing the characteristics of conversion, molar weight and polydispersity index of an N-acryloylmorpholine homopolymer obtained with the process of the invention using a temperature gradient.
Figure 2:
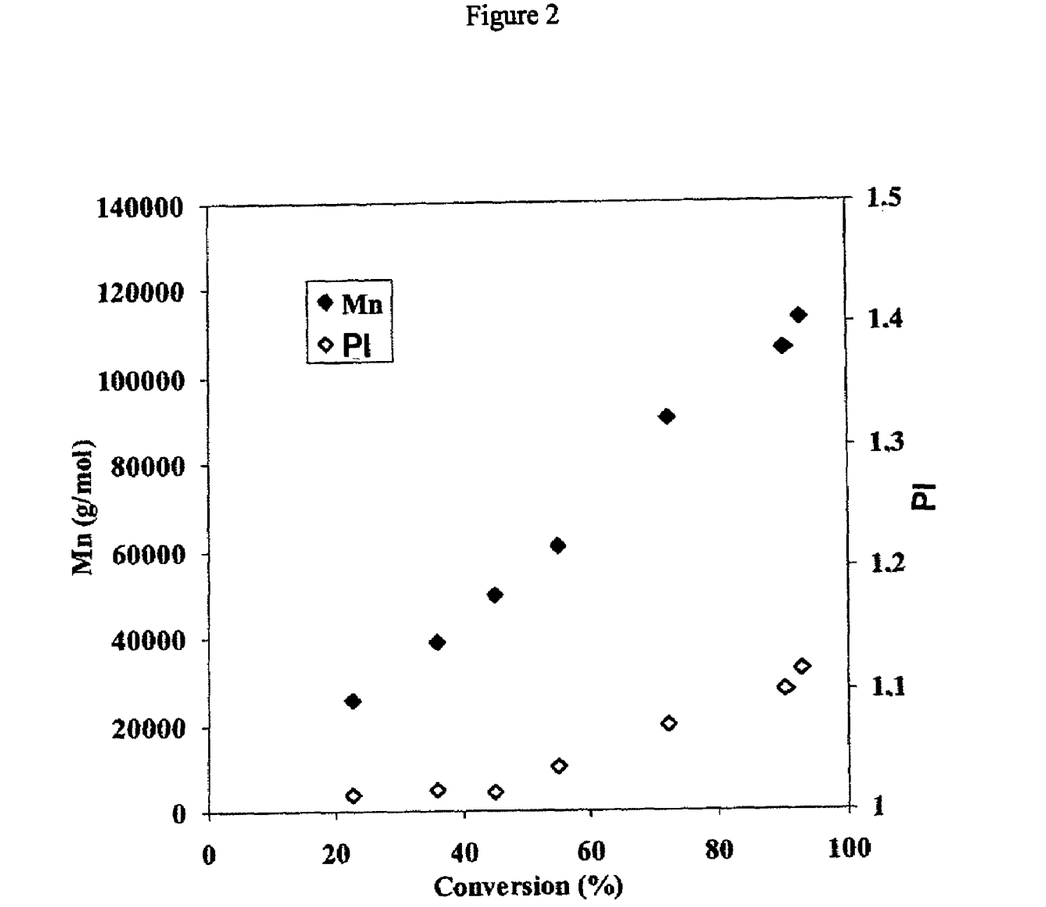
FIG. 2 represents a graph showing the characteristics of conversion, molar weight and polydispersity index of an N-acryloylmorpholine homopolymer obtained with the process of the invention using the initiator V65.
Figure 3:
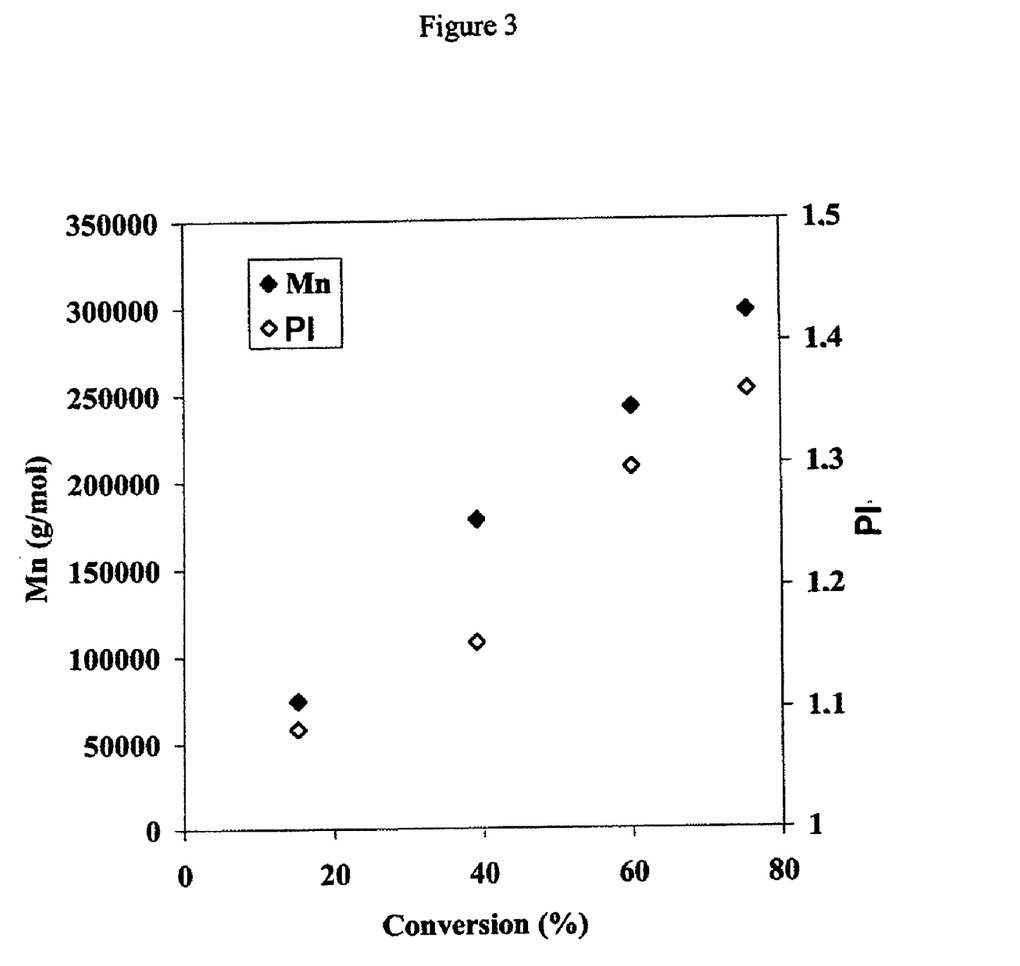
FIG. 3 represents a graph showing the characteristics of conversion, molar weight and polydispersity index of another N-acryloylmorpholine homopolymer obtained with the process of the invention using the initiator V65 in which the concentration of starting monomer has varied.

In the three cases, a linear growth in the molar weights with the conversion is obtained, as represented in FIGS. 1 to 3, FIG. 1 corresponding to the homopolymer A, FIG. 2 corresponding to the homopolymer B and FIG. 3 corresponding to the homopolymer C.

EXAMPLE 2

Synthesis of Novel Transfer Agents 2.1 Synthesis of 2,3-dimethylpropyl dithiobenzoate of Formula:

150 ml of a 0.016 mol.l$^{-1}$ solution of thiobenzoyl-thioglycolic acid in diethyl ether are added, with vigorous stirring and at ambient temperature, to 100 ml of a 0.028 mol.l$^{-1}$ basic aqueous solution (0.1N NaOH) of 3-mercapto-2-butanol (Aldrich, reference 26,479-2) (1.2 equivalents) in a 500 ml round-bottomed flask. After reacting for 12 h, the ethereal phase is washed with two times 500 ml of a basic aqueous solution (1N NaOH) and then with 500 ml of a 10% aqueous solution of NaCl. The 2,3-dimethylpropanol dithiobenzoate is purified by chromatography on silica gel (Kieselgel 60; eluent CH$_2$Cl$_2$); the purified product is obtained with a yield of greater than 90%.

2.2 Synthesis of bis(3-methylbutyl) 2-(thiobenzoyl-thio)succinate of Formula:

The procedure shown in part 2.1 above was used again to prepare the title compound, apart from the fact that diisoamyl thiomalate (Acros, reference 26514) was used instead of 3-mercapto-2-butanol.

The purified product is obtained with a yield of 50%.

2.3 Synthesis of Tert-nonyl Dithiobenzoate of Formula:

The procedure shown in part 2.1 above was used again to prepare the title compound, apart from the fact that tert-nonanethiol (Aldrich, reference 17,103-4) was used instead of 3-mercapto-2-butanol.

The crude product is obtained with a yield of 70%.

What is claimed is:

1. A process for controlled radical polymerization using an organosulfur reversible chain transfer agent which consists in preparing polymers having a number-average molecular weight of greater than 100,000 g/mol, said polymer having a polydispersity index of less than 1.2 for number-average molecular weight in the range of 100,000 to 200,000 g/mol and a polydispersity index of less than 1.4 for number-average molecular weight of greater than 200,000 g/mol, with a degree of conversion of monomer of greater than 75% and a polymerization time of less than 8 hours, said process comprising controlling the flux of initiator radicals in the polymerization medium.

2. The polymerization process as claimed in claim 1, wherein the control of the flux of initiator radicals is achieved by the stages consisting in:
   i) maintaining a uniform polymerization temperature $T_1$ during the initiation period, and
   ii) continuing the polymerization, the polymerization temperature being allowed to fall to the temperature $T_2$,
   it being understood that $T_1$ and $T_2$ correspond to the following equations (1) and (2):

$$T_1 > T_2 \tag{1}$$

$$T_1 - T_2 \leq 50° C. \tag{2}$$

3. The polymerization process as claimed in claim 2, wherein $T_1$ is between 60 and 95° C.

4. The polymerization process as claimed in claim 2, wherein $T_2$ is between 40 and 75° C.

5. The polymerization process as claimed in claim 2, wherein $T_1$ is equal to 80° C. and $T_2$ is equal to 60° C.

6. The polymerization process as claimed in claim 3, wherein the monomers are monomers derived from acrylamide.

7. The polymerization process as claimed in claim 2, wherein the chain transfer agent is tert-butyl dithiobenzoate.

8. The polymerization process as claimed in claim 2, wherein the initiating agent is azobisisobutyronitrile.

9. The polymerization process as claimed in claim 1, wherein the control of the flux of initiator radicals is achieved by the use of an initiating agent having a decomposition rate constant which is greater than that of azobisisobutyronitrile at the uniform temperature under consideration.

10. The polymerization process as claimed in claim 9, wherein the initiating agent is 2,2'-azobis(2,4-dimethylvaleronitrile).

11. The polymerization process as claimed in claim 9, wherein the polymerization is carried out at uniform temperature.

12. The polymerization process as claimed in claim 9, wherein the monomers are monomers derived from acrylamide.

13. The polymerization process as claimed in claim 9, wherein the chain transfer agent is tert-butyl dithiobenzoate.

* * * * *